United States Patent
Neiger et al.

(10) Patent No.: US 9,442,868 B2
(45) Date of Patent: *Sep. 13, 2016

(54) DELIVERING INTERRUPTS DIRECTLY TO A VIRTUAL PROCESSOR

(71) Applicant: Intel Corporation, Santa Clara, CA (US)

(72) Inventors: Gilbert Neiger, Portland, OR (US); Rajesh Sankaran Madukkarumukumana, Portland, OR (US); Richard A. Uhlig, Hillsboro, OR (US); Udo Steinberg, Sohland a.d.Spree (DE); Sebastian Schoenberg, Hillsboro, OR (US); Sridhar Muthrasanallur, Bangalore (IN); Steven M. Bennett, Hillsboro, OR (US); Andrew V. Anderson, Forest Grove, OR (US); Erik C. Cota-Robles, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/565,718

(22) Filed: Dec. 10, 2014

(65) Prior Publication Data
US 2015/0205736 A1   Jul. 23, 2015

Related U.S. Application Data

(63) Continuation of application No. 13/605,412, filed on Sep. 6, 2012, now Pat. No. 8,938,737, which is a continuation of application No. 11/323,114, filed on Dec. 30, 2005, now Pat. No. 8,286,162.

(51) Int. Cl.
*G06F 9/445* (2006.01)
*G06F 9/46* (2006.01)
(Continued)

(52) U.S. Cl.
CPC ........... *G06F 13/24* (2013.01); *G06F 9/45533* (2013.01); *G06F 9/4812* (2013.01)

(58) Field of Classification Search
None
See application file for complete search history.

(56) References Cited

U.S. PATENT DOCUMENTS 6,021,458 A   2/2000 Jayakumar et al.
6,192,425 B1  2/2001 Sato
(Continued)

FOREIGN PATENT DOCUMENTS

CN   1561485 A   1/2005
CN   1648866 A   8/2005
(Continued)

OTHER PUBLICATIONS

Chinese Patent Office, Office Action mailed May 26, 2015, in Chinese Patent Application No. 201210496906.8.
(Continued)

*Primary Examiner* — Adam Lee
(74) *Attorney, Agent, or Firm* — Trop, Pruner & Hu, P.C.

(57) ABSTRACT

Embodiments of apparatuses, methods, and systems for delivering an interrupt to a virtual processor are disclosed. In one embodiment, an apparatus includes an interface to receive an interrupt request, delivery logic, and exit logic. The delivery logic is to determine, based on an attribute of the interrupt request, whether the interrupt request is to be delivered to the virtual processor. The exit logic is to transfer control to a host if the delivery logic determines that the interrupt request is not to be delivered to the virtual processor.

17 Claims, 3 Drawing Sheets

(51) Int. Cl.
*G06F 13/24* (2006.01)
*G06F 13/26* (2006.01)
*G06F 3/00* (2006.01)
*G06F 13/00* (2006.01)
*G06F 9/455* (2006.01)
*G06F 9/48* (2006.01)

(56) References Cited

U.S. PATENT DOCUMENTS

| | | | |
|---|---|---|---|
| 6,192,442 | B1 | 2/2001 | Haren et al. |
| 6,401,154 | B1 | 6/2002 | Chiu et al. |
| 6,665,708 | B1 | 12/2003 | Tikekar et al. |
| 7,209,994 | B1 | 4/2007 | Klaiber et al. |
| 7,222,203 | B2 | 5/2007 | Madukkarumukumana et al. |
| 7,237,051 | B2 | 6/2007 | Bennett et al. |
| 7,707,341 | B1 | 4/2010 | Klaiber et al. |
| 7,818,808 | B1 | 10/2010 | Neiger et al. |
| 8,286,162 | B2 | 10/2012 | Neiger et al. |
| 2002/0083254 | A1 | 6/2002 | Hummel et al. |
| 2004/0003324 | A1* | 1/2004 | Uhlig et al. ............ 714/38 |
| 2004/0117532 | A1 | 6/2004 | Bennett et al. |
| 2004/0230871 | A1 | 11/2004 | Sekiguchi et al. |
| 2005/0144346 | A1 | 6/2005 | Barth et al. |
| 2006/0036775 | A1* | 2/2006 | Levit-Gurevich ............ 710/1 |
| 2006/0123172 | A1 | 6/2006 | Herrell et al. |
| 2006/0200616 | A1* | 9/2006 | Maliszewski ............ 711/6 |
| 2006/0282591 | A1 | 12/2006 | Krithivas |

FOREIGN PATENT DOCUMENTS

| | | |
|---|---|---|
| WO | 2004003749 A2 | 1/2004 |
| WO | 2005029327 A1 | 3/2005 |

OTHER PUBLICATIONS

Chinese Patent Office, Chinese Office Action Mailed Sep. 15, 2014, in Chinese Application No. 201210496906.8.

State Intellectual Property Office, P.R. China, Third Chinese Office Action mailed Dec. 7, 2015, in Chinese Patent Application No. 201210496906.8.

State Intellectual Property Office, People's Republic of China, Decision on Rejection mailed Jun. 13, 2016 in Chinese Patent Application No. 201210496906.8.

* cited by examiner

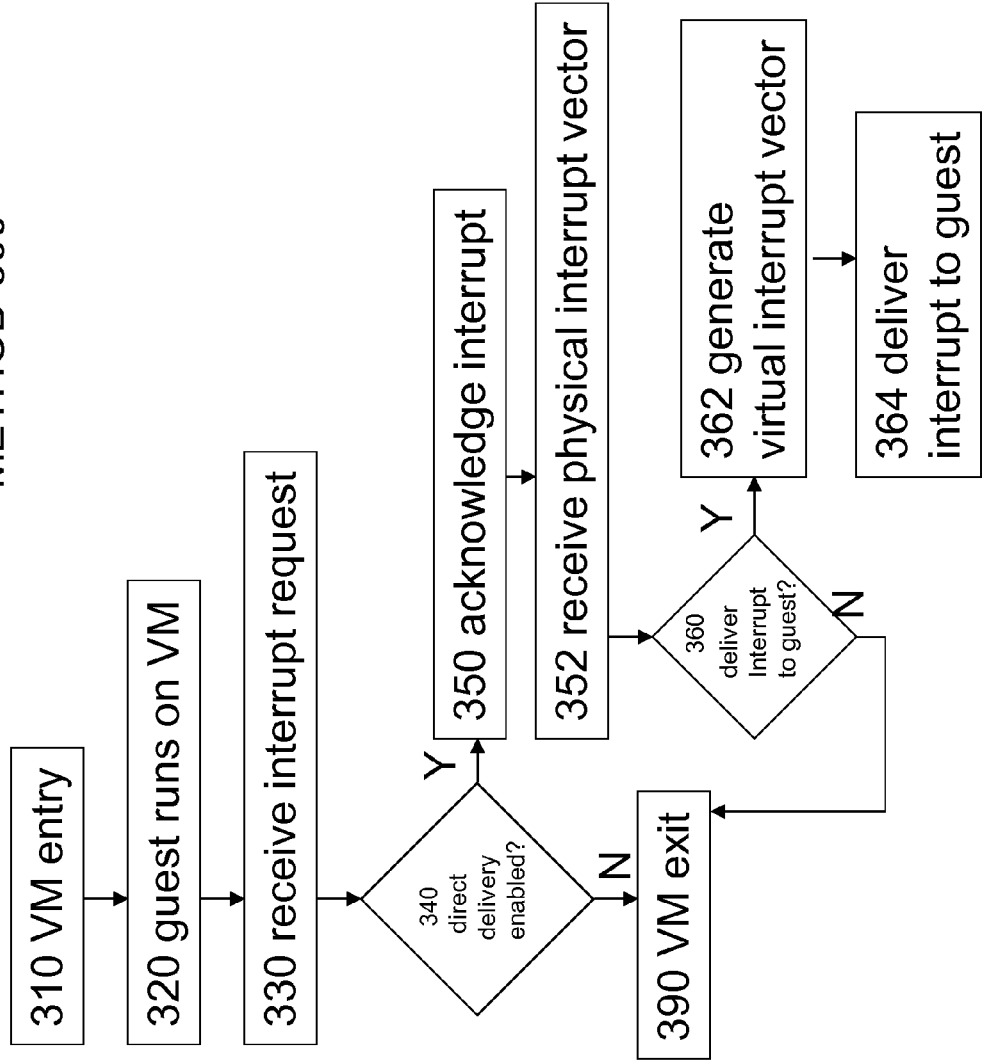

DELIVERING INTERRUPTS DIRECTLY TO A VIRTUAL PROCESSOR

This application is a continuation of U.S. patent application Ser. No. 13/605,412, filed Sep. 6, 2012, which is a continuation of U.S. patent application Ser. No. 11/323,114, filed Dec. 30, 2005, now U.S. Pat. No. 8,286,162, issued Oct. 9, 2012, the content of which is hereby incorporated by reference.

BACKGROUND

The present disclosure pertains to the field of information processing, and more particularly, to the field of handling interrupts in a virtualization environment.

Generally, the concept of virtualization in information processing systems allows multiple instances of one or more operating systems (each, an "OS") to run on a single information processing system, even though each OS is designed to have complete, direct control over the system and its resources. Virtualization is typically implemented by using software (e.g., a virtual machine monitor, or a "VMM") to present to each OS a "virtual machine" ("VM") having virtual resources, including one or more virtual processors, that the OS may completely and directly control, while the VMM maintains a system environment for implementing virtualization policies such as sharing and/or allocating the physical resources among the VMs (the "virtualization environment"). Each OS, and any other software, that runs on a VM is referred to as a "guest" or as "guest software," while a "host" or "host software" is software, such as a VMM, that runs outside of, and may or may not be aware of, the virtualization environment.

A physical processor in an information processing system may support virtualization, for example, by supporting an instruction to enter a virtualization environment to run a guest on a virtual processor (i.e., a physical processor under constraints imposed by a VMM) in a VM. In the virtualization environment, certain events, operations, and situations, such as external interrupts or attempts to access privileged registers or resources, may be "intercepted," i.e., cause the processor to exit the virtualization environment so that a VMM may operate, for example, to implement virtualization policies. A physical processor may also support other instructions for maintaining a virtualization environment, and may include memory or register bits that indicate or control virtualization capabilities of the physical processor.

A physical processor supporting a virtualization environment may receive an interrupt request while a guest is running on a virtual processor within the virtual environment. Typically, the interrupt request would be intercepted and control would be transferred to a VMM to determine how to handle the interrupt. For example, an interrupt service routine may be called by the VMM, or the VMM may create a virtual interrupt and inject it into a VM to allow a guest to call an interrupt service routine. In many cases, the VM that is entered to call the interrupt service request may be the same VM that was exited to allow the VMM to intercept the interrupt request. For example, the interrupt request may have been generated by an input/output ("I/O") device assigned to the same VM that was exited, or an interrupt request may be an inter-processor interrupt between two virtual processors in the same VM.

BRIEF DESCRIPTION OF THE DRAWINGS

The present invention is illustrated by way of example and not limitation in the accompanying figures.

FIG. 2 illustrates an embodiment of the present invention in a method for a VMM to initialize support for delivering an interrupt directly to a virtual processor.

FIG. 3 illustrates an embodiment of the present invention in a method for delivering an interrupt directly to a virtual processor.

DETAILED DESCRIPTION

Figure 1:
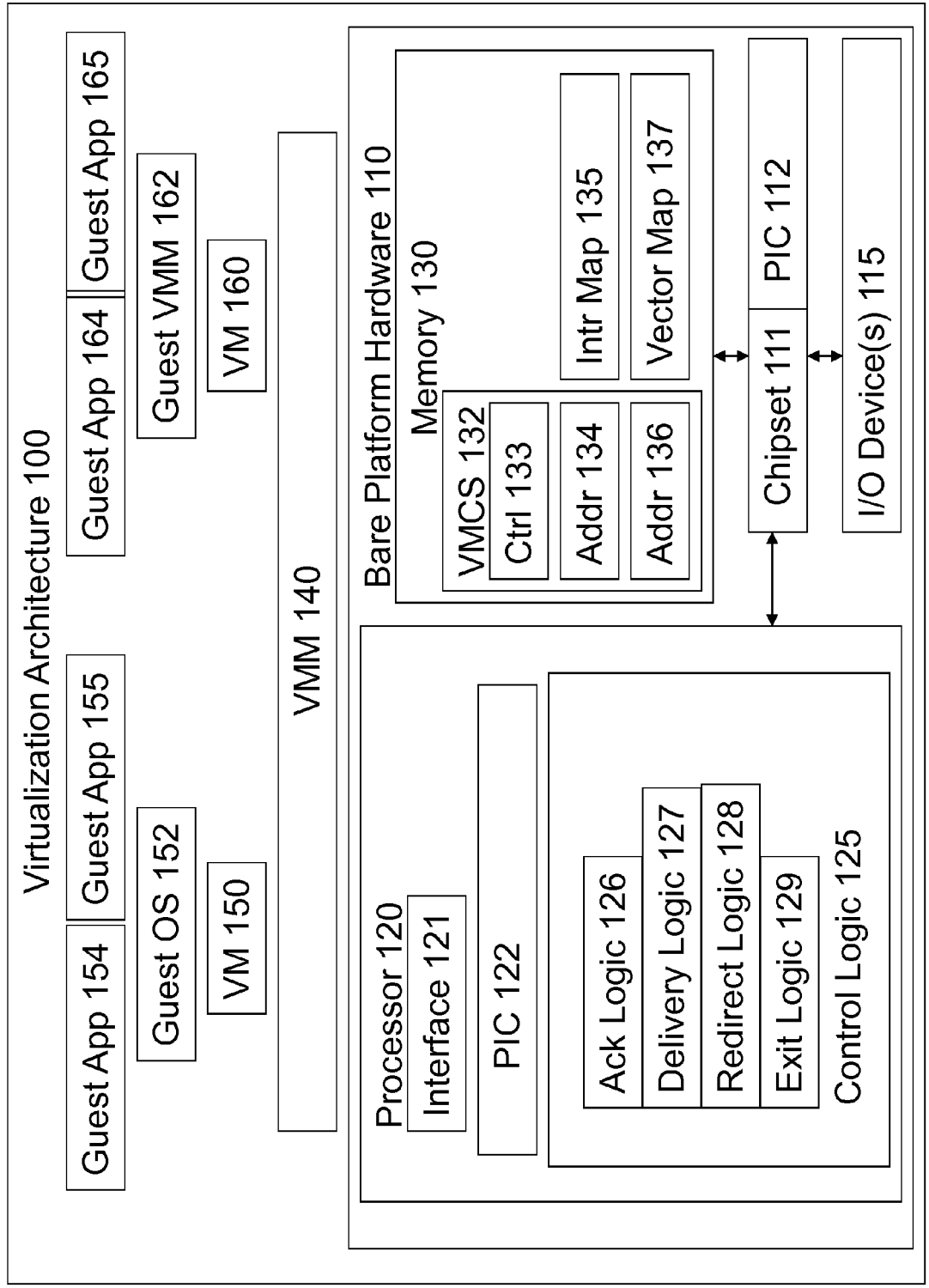
FIG. 1 illustrates a virtualization environment, in which an embodiment of the present invention may operate.

Embodiments of apparatuses, methods, and systems for delivering interrupts directly to a virtual processor are described below. In this description, numerous specific details, such as component and system configurations, may be set forth in order to provide a more thorough understanding of the present invention. It will be appreciated, however, by one skilled in the art, that the invention may be practiced without such specific details. Additionally, some well known structures, circuits, and the like have not been shown in detail, to avoid unnecessarily obscuring the present invention.

The performance of a virtualization environment may be improved if the frequency of intercepted events is minimized. Embodiments of the invention may be used to support the delivery of an interrupt request to a virtual processor ("direct delivery") without requiring interception by a VMM. Therefore, performance may be improved over a virtualization environment in which all interrupt requests are intercepted by a VMM.

FIG. 1 illustrates virtualization architecture 100, in which an embodiment of the present invention may operate. In FIG. 1, bare platform hardware 110 may be any data processing apparatus capable of executing any OS or VMM software. For example, bare platform hardware may be that of a personal computer, mainframe computer, portable computer, handheld device, set-top box, server, or any other computing system. Bare platform hardware 110 includes processor 120, memory 130, input/output ("I/O") device 115, and chipset 111.

Processor 120 may be any type of processor, including a general purpose microprocessor, such as a processor in the Pentium® Processor Family, the Itanium® Processor Family, or other processor family from Intel Corporation, or another processor from another company, or a digital signal processor or microcontroller. Although FIG. 1 shows only one such processor 120, bare platform hardware 110 may include any number of processors, including any number of multicore processors, each with any number of execution cores, and any number of multithreaded processors, each with any number of threads.

Memory 130 may be static or dynamic random access memory, semiconductor-based read-only or flash memory, magnetic or optical disk memory, any other type of medium readable by processor 120, or any combination of such mediums. I/O device(s) 115 may represent any number of peripheral or I/O devices, such as a monitor, a keyboard, a mouse, a printer, a network interface, an information storage device, etc. Chipset 111 may be include any number of components that perform any number of tasks, such as system logic, bus control, bus interfacing, bus bridging, memory control, peripheral device control, peripheral device functions, system configuration, etc.

Processor 120, memory 130, I/O device(s) 115, and chipset 111 may be coupled to or communicate with each other according to any known approach, such as directly or indirectly through one or more buses, point-to-point, or other wired or wireless connections. Bare platform hardware 110 may also include any number of additional devices or connections.

In addition to bare platform hardware 100, FIG. 1 illustrates VMM 140, VMs 150 and 160, and guests 152, 154, 155, 162, 164, and 165.

VMM 140 may be any software, firmware, or hardware host installed on or accessible to bare platform hardware 110, to present VMs, i.e., abstractions of bare platform hardware 110, to guests, or to otherwise create VMs, manage VMs, and implement virtualization policies within virtualization environment 100. In other embodiments, a host may be any VMM, hypervisor, OS, or other software, firmware, or hardware capable of controlling bare platform hardware 110. A guest may be any OS, any VMM, including another instance of VMM 140, any hypervisor, or any application or other software.

Each guest expects to access physical resources, such as processor and platform registers, memory, and input/output devices, of bare platform hardware 110, according to the architecture of the processor and the platform presented in the VM. FIG. 1 shows two VMs, 150 and 160, with guest OS 152 and guest applications 154 and 155 installed on VM 150 and guest OS 162 and guest applications 164 and 165 installed on VM 160. Although FIG. 1 shows only two VMs and two applications per VM, any number of VMs may be created, and any number of applications may run on each VM within the scope of the present invention.

A resource that can be accessed by a guest may either be classified as a "privileged" or a "non-privileged" resource. For a privileged resource, VMM 140 facilitates the functionality desired by the guest while retaining ultimate control over the resource. Non-privileged resources do not need to be controlled by VMM 140 and may be accessed directly by a guest.

Furthermore, each guest OS expects to handle various events such as exceptions (e.g., page faults, and general protection faults), interrupts (e.g., hardware interrupts and software interrupts), and platform events (e.g., initialization and system management interrupts). These exceptions, interrupts, and platform events are referred to collectively and individually as "events" herein. Some of these events are "privileged" because they must be handled by VMM 140 to ensure proper operation of VMs 150 and 160, protection of VMM 140 from guests, and protection of guests from each other.

At any given time, processor 120 may be executing instructions from VMM 140 or any guest, thus VMM 140 or the guest may be running on, or in control of, processor 120. When a privileged event occurs or a guest attempts to access a privileged resource, control may be transferred from the guest to VMM 140. The transfer of control from a guest to VMM 140 is referred to as a "VM exit" herein. After handling the event or facilitating the access to the resource appropriately, VMM 140 may return control to a guest. The transfer of control from VMM 140 to a guest is referred to as a "VM entry" herein.

In the embodiment of FIG. 1, processor 120 controls the operation of VMs 150 and 160 according to data stored in virtual machine control structure ("VMCS") 132. VMCS 132 is a structure that may contain state of a guest or guests, state of VMM 140, execution control information indicating how VMM 140 is to control operation of a guest or guests, information regarding VM exits and VM entries, any other such information. Processor 120 reads information from VMCS 132 to determine the execution environment of a VM and constrain its behavior. In this embodiment, VMCS 132 is stored in memory 130. In some embodiments, multiple VMCSs are used to support multiple VMs. Although FIG. 1 shows VMCS 132 stored in memory 130, storing a VMCS in a memory is not required by the present invention.

Processor 120 may include interrupt controller 122 to receive, generate, prioritize, deliver, hold pending, or otherwise control or manage interrupt requests. For example, interrupt controller 122 may be a local Advanced Programmable Interrupt Controller ("APIC") according to the architecture of the Pentium® Processor Family. Chipset 111 may also include interrupt controller 112 to receive, generate, prioritize, deliver, hold pending, or otherwise control or manage interrupt requests in addition to, connection with, or instead of interrupt controller 112. For example, interrupt controller 112 may be an I/O APIC. Processor 120 and/or chipset 111 may include any other interrupt controller, and/or any other processor, chipset, or component not shown in FIG. 1 may include an interrupt controller, and/or interrupt requests may be controlled or managed according to any other approach.

Processor 120 also includes interface 121, which may be a bus unit or any other unit, port, or interface to allow processor 120 to receive interrupt requests and interrupt vectors through any type of bus, point to point, or other connection, directly or through any other component, such as chipset 111. Interface 121 may be an internal interface, e.g., to receive interrupts requests from a local APIC, and/or an external interface, e.g., to receive interrupt requests from an external source.

Additionally, processor 120 includes control logic 125 to support virtualization, including the delivery of interrupts to virtual processors. Control logic 125 may be microcode, programmable logic, hard-coded logic, or any other form of control logic within processor 120. In other embodiments, control logic 125 may be implemented in any form of hardware, software, or firmware, such as a processor abstraction layer, within a processor or within any component accessible or medium readable by a processor, such as memory 130.

Control logic 125 causes processor 120 to execute method embodiments of the present invention, such as the method embodiments illustrated in below in FIGS. 2 and 3, for example, by causing processor 120 to include the execution of one or more micro-operations, e.g., to support virtualization, in its response to virtualization instructions or other instructions from a host or guest.

Control logic 125 includes interrupt acknowledge logic 126, interrupt delivery logic 127, interrupt redirect logic 128, and exit logic 129. Interrupt acknowledge logic 126 is to acknowledge interrupt requests, which in some embodiments may cause an interrupt vector to be delivered to processor 120. Interrupt delivery logic 127 is to determine whether interrupt requests are to be delivered to virtual processors. Interrupt redirection logic 128 is to redirect interrupts for delivery to virtual processors instead of physical processor 120, for example by translating physical interrupt vectors to virtual interrupt vectors. Exit logic 129 is to prepare for and cause VM exits if interrupt requests are not to be delivered to virtual processors. Each of these logic units may also perform additional functions, including those described as being performed by another of the logic units, and any or all of these logic units may be integrated into a single logic unit.

VMCS 132 may include fields, control bits, or other data structures to support virtualization, including the delivery of interrupts to virtual processors. These data structures may be checked or otherwise referred to by control logic 125 to determine how to manage a VM environment. For example, interrupt-assignment control bit 133 may be set to enable the direct delivery of interrupt requests to virtual processors, as described below. In this description of this embodiment, control bits are set to enable or cause a desired effect, where set means writing a logical one to the bit, but any logic convention or nomenclature may be used within the scope of the present invention.

Also in VMCS 132, address field 134 may be used to store an address of a memory location at which a data structure to indicate whether an interrupt is to be delivered to a virtual processor may be stored. For example, the address may be the 64-bit address of a 256-bit array that includes one configuration bit for each of up to 256 physical interrupt vectors. Similarly, address field 136 may be used to store an address of a memory location at which a data structure to provide a virtual interrupt vector may be stored. For example, the address may be a 64-bit address of a 256-byte array that includes a one-byte virtual interrupt vector for each of up to 256 physical interrupt vectors. In an alternative embodiment, VMCS 132 may include data structures to directly store such indicators or virtual interrupt vectors.

FIGS. 2 and 3 illustrate method embodiments of the present invention. Although method embodiments are not limited in this respect, reference is made to virtualization environment 100 of FIG. 1 to describe the method embodiments of FIGS. 2 and 3.

FIG. 2 illustrates an embodiment of the present invention in a method for a VMM to initialize support for delivering interrupts directly to virtual processors.

In box 210 of FIG. 2, VMM 140 of FIG. 1 creates a VMCS (e.g., VMCS 132) for a VM. In boxes 212 to 217, VMM 140 configures VMCS 132 to implement support for delivering an interrupt to a virtual processor. In box 212, interrupt-assignment control bit 133 is set to enable the direct delivery of interrupts to a virtual processor, as described below.

In box 214, an address of a memory location for storing a data structure to indicate whether an interrupt is to be delivered to the virtual processor is written to address field 134. Each of a certain number of potential interrupts (e.g., 256) may be identified by a physical interrupt vector. The data structure (e.g., interrupt bitmap 135) may include an entry for each of the physical interrupt vectors. Each entry may include a configuration bit to indicate whether the physical interrupt corresponding to each physical interrupt vector is to be delivered to the virtual processor. In box 215, the data structure is initialized, for example, by storing the physical interrupt vectors and for each, a desired configuration bit.

In box 216, an address of a memory location for storing a data structure to map the physical interrupt vectors to virtual interrupt vectors is written to address field 136. The data structure (e.g., vector redirection map 137) may include an entry for each of the physical interrupt vectors. Each entry may include a virtual interrupt vector corresponding to the physical interrupt vector for each interrupt to be delivered to the virtual processor. Such remapping may be used, for example, to account for the remapping of system memory 130, or a portion of system memory 130, to the memory allocated to the VM that includes the virtual processor. In box 217, the data structure is initialized, for example, by storing the physical interrupt vectors and for each, a desired virtual interrupt vector.

FIG. 3 illustrates an embodiment of the present invention in a method for delivering interrupts directly to virtual processors.

In box 310 of FIG. 3, a VM entry is performed and control is transferred to a guest. In box 320, the guest begins or continues to run on a virtual processor in the VM. In box 330, interface 121 receives an interrupt request. The interrupt request may be from an interrupt controller, such as interrupt controller 122 or 112, or any other device. In some embodiments, the interrupt may be an inter-processor interrupt generated by another physical processor, or generated by a guest to its own virtual processor.

In box 340, control logic 125 checks interrupt-assignment control bit 133 to determine if direct delivery of interrupts to the virtual processor is enabled. If direct delivery of interrupts to the virtual processor is not enabled, then, in box 390, exit logic 129 causes a VM exit to occur to allow the VMM to handle the interrupt. In some embodiments, exit logic 129 determines if a VM exit is required in this situation by consulting one or more control bits in the VMCS, e.g., an interrupt-exiting control bit. In some embodiments, exit logic 129 acknowledges the interrupt request and fetches the interrupt vector. In some embodiments, this interrupt acknowledgement as part of a VM exit due to a hardware interrupt may be controlled by one or more control bits in the VMCS, e.g., an acknowledge interrupt on exit control bit.

However, if direct delivery of interrupts to the virtual processor is enabled, then, in box 350, interrupt acknowledge logic 126 acknowledges the interrupt request, for example, by sending an interrupt acknowledge message. In an embodiment where the processor includes a local APIC, the interrupt request is acknowledged at the local APIC. In box 352, processor 120 receives the physical interrupt vector. In an embodiment where the processor includes a local APIC, acknowledgement of the interrupt request may also cause the interrupt request register ("IRR"), in-service register ("ISR"), and processor priority register ("PPR") to be updated.

In box 360, interrupt delivery logic 127 determines if the interrupt is to be delivered to the virtual processor, for example, by checking interrupt bitmap 135. The determination may also or instead be based on other attributes of the interrupt request, such as a delivery mode (e.g., fixed or user-defined, SMI (system management interrupt), NMI (non-maskable interrupt), MNIT (soft reset), or external) and a trigger mode (e.g., edge or level)). If the interrupt is not to be delivered to the virtual processor, then, in box 390, exit logic 129 causes a VM exit to occur to allow the VMM to handle the interrupt. The physical interrupt vector may be provided to the VMM by storing it in a VM-exit field in the VMCS.

If, however, the interrupt is to be delivered to the virtual processor, then, in box 362, interrupt redirection logic 128 redirects the interrupt for delivery to the virtual processor instead of the physical processor, for example, by translating the physical interrupt vector to a virtual interrupt vector. In this embodiment, the translation is performed by looking up the physical interrupt vector in interrupt vector redirection map 137 to find the corresponding virtual interrupt vector.

In an embodiment including a local APIC, box 362 may also include other actions to properly manage interrupt requests. For example, control logic 125 may cause the end-of-interrupt ("EOI") register in the local APIC to be cleared, so that the ISR and PPR are updated.

In box 364, the redirected interrupt is delivered to the virtual processor, for example, by using the virtual interrupt vector as in index into an interrupt descriptor table ("IDT") associated with the virtual processor to find an entry point of an interrupt handler. In some embodiments, the redirected interrupt may be held pending prior to delivery to the virtual processor, depending on the priority of the interrupt. The prioritization may be between interrupts to be delivered to the virtual processor, or may also include interrupts to be delivered to the VMM.

In embodiments with sharable interrupt request lines, any of a variety of techniques may be used to prevent a first interrupt handler associated with a first interrupt request directed to a virtual processor from automatically linking to a second interrupt handler associated with a second interrupt request not directed to the virtual processor. In one embodiment, the EOI register of the local APIC may be cleared with a special message that is not broadcast to I/O APICs. In another embodiment, the determination of whether an interrupt request is to be delivered to a virtual processor may be based on a trigger mode (e.g., edge or level) or other attribute indicating shareability.

Furthermore, in some embodiments the EOI message from an interrupt handler called as a result of a directly delivered interrupt may be intercepted, while in other embodiments a processor may include control logic to handle it without a VM exit.

Within the scope of the present invention, the methods illustrated in FIGS. 2 and 3 may be performed in a different order, with illustrated boxes omitted, with additional boxes added, or with a combination of reordered, omitted, or additional boxes. For example, a VMCS may configure a VMCS in any order, e.g., boxes 212 to 217 may be rearranged in any order.

Processor 120, or any other component or portion of a component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these media may "carry" or "indicate" the design, or other information used in an embodiment of the present invention, such as the instructions in an error recovery routine. When an electrical carrier wave indicating or carrying the information is transmitted, to the extent that copying, buffering, or re-transmission of the electrical signal is performed, a new copy is made. Thus, the actions of a communication provider or a network provider may constitute the making of copies of an article, e.g., a carrier wave, embodying techniques of the present invention.

Thus, apparatuses, methods, and systems for delivering interrupts directly to a virtual processor have been disclosed. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   an interface to receive an interrupt during execution of a guest on a virtual processor;
   control logic coupled to the interface, the control logic including:
      redirection control hardware to translate a physical interrupt vector that is to identify the interrupt to a virtual interrupt vector based on information stored in an entry in an interrupt redirection data structure;
      delivery control hardware to determine whether the interrupt is to be delivered to the virtual processor, and if so to deliver the interrupt to the virtual processor without a virtual machine exit; and
      exit control hardware to cause the virtual machine exit if the interrupt is not to be delivered to the virtual processor.

2. The processor of claim 1, wherein the delivery control hardware is to determine whether the interrupt is to be delivered to the virtual processor based on information stored in an entry for the physical interrupt vector in an interrupt delivery data structure.

3. The processor of claim 2, wherein the interrupt delivery data structure comprises a plurality of entries each to store a configuration bit to indicate whether an interrupt corresponding to a physical interrupt vector is to be delivered to a virtual processor.

4. The processor of claim 1, further comprising a vector redirection map including a plurality of entries each to store a virtual interrupt vector corresponding to a physical interrupt vector.

5. The processor of claim 1, wherein the interrupt comprises an inter-processor interrupt generated by a second processor.

6. The processor of claim 1, wherein the guest is to generate the interrupt.

7. The processor of claim 1, further comprising acknowledge control hardware to acknowledge the interrupt to cause the delivery of the interrupt.

8. The processor of claim 1, wherein the delivery control hardware is to directly deliver the interrupt to the virtual processor without interception by a virtual machine monitor.

9. The processor of claim 1, wherein the processor comprises a plurality of cores.

10. The processor of claim 9, wherein the processor further comprises an interrupt controller.

11. The processor of claim 10, wherein the interrupt controller comprises a local advanced programmable interrupt controller.

12. A non-transitory machine-readable medium having stored thereon instructions, which if performed by a machine cause the machine to perform a method comprising:
   receiving an interrupt during execution of a guest on a virtual processor;
   translating a physical interrupt vector that is to identify the interrupt to a virtual interrupt vector based on information stored in an entry in an interrupt redirection data structure;
   determining whether the interrupt is to be delivered to the virtual processor, and if so delivering the interrupt to the virtual processor without a virtual machine exit; and
   causing the virtual machine exit if the interrupt is not to be delivered to the virtual processor.

13. The non-transitory machine-readable medium of claim 12, wherein determining whether the interrupt is to be delivered to the virtual processor is based on information stored in an entry for the physical interrupt vector in an interrupt delivery data structure.

14. The non-transitory machine-readable medium of claim 12, wherein the method further comprises acknowledging the interrupt to cause delivery of the physical interrupt vector.

15. A system comprising:
   a memory to store a data structure to control a virtual machine having a virtual processor; and
   a physical processor including:
      an interface to receive an interrupt during execution of a guest on the virtual processor;
      redirection control hardware to translate a physical interrupt vector that is to identify the interrupt to a virtual interrupt vector based on information stored in an entry in an interrupt redirection data structure;
      delivery control hardware to determine whether the interrupt is to be delivered to the virtual processor, and if so to deliver the interrupt to the virtual processor without a virtual machine exit; and
      exit control hardware to cause the virtual machine exit if the interrupt is not to be delivered to the virtual processor.

16. The system of claim 15, wherein the redirection control hardware is to determine whether the interrupt request is to be delivered to the virtual processor based on information stored in an entry for the physical interrupt vector in the interrupt redirection data structure.

17. The system of claim 15, wherein the physical processor comprises a plurality of cores and an interrupt controller.

\* \* \* \* \*